US009285066B2

(12) United States Patent
Brunette

(10) Patent No.: US 9,285,066 B2
(45) Date of Patent: Mar. 15, 2016

(54) POSITIVE PRESSURE PIPE COUPLING

(75) Inventor: Eric Brunette, Laval (CA)

(73) Assignee: Cheminee Securite International Ltee, Quebec (CA)

( * ) Notice: Subject to any disclaimer, the term of this patent is extended or adjusted under 35 U.S.C. 154(b) by 896 days.

(21) Appl. No.: 12/608,898

(22) Filed: Oct. 29, 2009

(65) Prior Publication Data

US 2010/0178860 A1    Jul. 15, 2010

Related U.S. Application Data

(60) Provisional application No. 61/205,278, filed on Jan. 15, 2009.

(51) Int. Cl.
| | |
|---|---|
| *F23J 13/02* | (2006.01) |
| *F16L 55/00* | (2006.01) |
| *F16L 39/04* | (2006.01) |
| *F23J 13/04* | (2006.01) |
| *F23J 11/00* | (2006.01) |
| *F16L 59/147* | (2006.01) |
| *F16L 37/252* | (2006.01) |
| *F01N 13/14* | (2010.01) |
| *F16L 59/18* | (2006.01) |

(52) U.S. Cl.
CPC ............. *F16L 59/184* (2013.01); *F23J 13/025* (2013.01); *F23J 2213/202* (2013.01); *F23J 2213/40* (2013.01)

(58) Field of Classification Search
USPC .......... 454/44; 285/48, 47; 126/312; 138/149
See application file for complete search history.

(56) References Cited

U.S. PATENT DOCUMENTS

| | | | | |
|---|---|---|---|---|
| 2,650,112 | A | * | 8/1953 | Kinkead .................... 285/47 |
| 2,679,567 | A | * | 5/1954 | Kradel ...................... 218/11 |
| 2,679,867 | A | * | 6/1954 | Epstein .................. 285/123.16 |
| 2,851,288 | A | * | 9/1958 | Kinkead ................. 285/123.16 |
| 3,146,005 | A | * | 8/1964 | Peyton ...................... 285/47 |
| 3,170,544 | A | * | 2/1965 | Kinkead et al. ............... 285/47 |
| 3,272,537 | A | * | 9/1966 | Bellatorre et al. ........... 285/187 |
| 3,399,617 | A | * | 9/1968 | Gray ...................... 454/38 |
| 3,902,744 | A | * | 9/1975 | Stone ...................... 285/47 |
| 4,029,344 | A | * | 6/1977 | Stone ...................... 285/47 |
| 4,219,225 | A | * | 8/1980 | Sigmund ................ F16L 59/16 277/616 |
| 4,462,618 | A | * | 7/1984 | Stone ...................... 285/47 |
| 4,576,404 | A | * | 3/1986 | Weber .................... F16L 51/02 285/226 |
| 4,629,226 | A | * | 12/1986 | Cassel et al. ................ 285/382 |
| 4,645,899 | A | * | 2/1987 | Bebber et al. ............ 219/121.49 |
| 4,685,703 | A | * | 8/1987 | Brock ...................... 285/47 |
| 4,720,125 | A | * | 1/1988 | Ream et al. ................. 285/47 |

(Continued)

FOREIGN PATENT DOCUMENTS

FR          2894316  A1  *  6/2007

*Primary Examiner* — Gregory Huson
*Assistant Examiner* — Eric Gorman
(74) *Attorney, Agent, or Firm* — Christie, Parker & Hale, LLP

(57) ABSTRACT

A vent pipe and system formed from such vent pipes is provided. The vent pipe includes an inner casing, an outer casing surrounding the inner casing, and an insulation material between the inner and outer casings. The vent pipe also includes, a male end portion, a female and portion for receiving a male end portion end of another vent pipe, the female end portion being opposite the male end portion. The vent pipe further includes a first flange extending from the male end portion, and a second flange extending from the female end portion for mating with the first external extending from the male portion of another vent pipe.

16 Claims, 5 Drawing Sheets

(56) References Cited

U.S. PATENT DOCUMENTS

| | | | |
|---|---|---|---|
| 4,724,750 A * | 2/1988 | Coleman et al. | 454/47 |
| 4,781,402 A * | 11/1988 | Ream et al. | 285/47 |
| 4,846,147 A * | 7/1989 | Townsend et al. | 126/307 R |
| 4,930,815 A * | 6/1990 | Tuggler, Jr. | 285/142.1 |
| 4,958,620 A * | 9/1990 | Nelson | 122/19.2 |
| 5,165,732 A * | 11/1992 | Townsend | 285/226 |
| 5,199,747 A * | 4/1993 | Jahr | 285/47 |
| 5,314,214 A * | 5/1994 | Highlen et al. | 285/233 |
| 5,316,320 A * | 5/1994 | Breaker | 277/611 |
| 5,331,810 A * | 7/1994 | Ingermann | F01N 3/2006 60/272 |
| 5,358,284 A * | 10/1994 | Broyles | F16L 59/21 285/229 |
| 5,419,127 A * | 5/1995 | Moore, III | 60/322 |
| 5,478,123 A * | 12/1995 | Kanao | F16L 13/103 285/291.1 |
| 5,680,770 A * | 10/1997 | Hall et al. | 62/293 |
| 5,812,062 A * | 9/1998 | Roberts | 340/664 |
| 5,907,134 A * | 5/1999 | Nording | F01N 13/08 138/113 |
| 6,030,005 A * | 2/2000 | Andersson et al. | 285/367 |
| 6,062,608 A * | 5/2000 | Gerth | 285/123.15 |
| 6,296,282 B1 * | 10/2001 | Burkhardt et al. | 285/49 |
| 6,471,249 B1 * | 10/2002 | Lewis | 285/31 |
| 6,533,334 B1 * | 3/2003 | Bonn | 285/145.5 |
| 6,543,575 B1 * | 4/2003 | Marcellus | F16L 39/005 137/312 |
| 6,748,941 B1 * | 6/2004 | Ross | 126/500 |
| 7,393,021 B1 * | 7/2008 | Lukjan | 285/424 |
| 7,442,120 B2 * | 10/2008 | Poirier et al. | 454/270 |
| 7,779,624 B2 * | 8/2010 | Belisle et al. | 60/299 |
| 8,042,840 B2 * | 10/2011 | Chahine et al. | 285/226 |
| 8,109,539 B2 * | 2/2012 | Krohn | 285/322 |
| 8,814,223 B2 * | 8/2014 | Choi | 285/288.1 |
| 2002/0089177 A1 * | 7/2002 | Bonn | 285/123.5 |
| 2002/0163182 A1 * | 11/2002 | Kirkegaard | 285/47 |
| 2003/0214131 A1 * | 11/2003 | Kanao | F16L 21/002 285/238 |
| 2004/0079431 A1 * | 4/2004 | Kissell | 138/149 |
| 2005/0116470 A1 * | 6/2005 | Duffy | 285/424 |
| 2006/0082154 A1 * | 4/2006 | Hartig et al. | 285/408 |
| 2007/0257487 A1 * | 11/2007 | Jacklich et al. | 285/401 |
| 2009/0133772 A1 * | 5/2009 | Cachon et al. | 138/149 |
| 2009/0272453 A1 * | 11/2009 | Schlecht | B65G 53/32 138/109 |
| 2011/0272941 A1 * | 11/2011 | Broderick et al. | 285/337 |
| 2012/0138044 A1 * | 6/2012 | Brunette | F16L 37/20 126/312 |
| 2012/0138058 A1 * | 6/2012 | Fu et al. | 128/204.23 |
| 2013/0130606 A1 * | 5/2013 | Brunette | F23J 13/02 454/47 |
| 2013/0156652 A1 * | 6/2013 | Kamei et al. | 422/170 |
| 2013/0174934 A1 * | 7/2013 | Duffy | 138/149 |
| 2014/0326724 A1 * | 11/2014 | Steinmann et al. | 220/86.1 |
| 2015/0027581 A1 * | 1/2015 | Bouey et al. | 138/141 |
| 2015/0091290 A1 * | 4/2015 | Conrad | F16L 13/116 285/21.1 |

* cited by examiner

PRIOR ART

PRIOR ART

PRIOR ART

US 9,285,066 B2

POSITIVE PRESSURE PIPE COUPLING

CROSS-REFERENCE TO RELATED APPLICATION

This application is based upon and claims priority on U.S. Provisional Application No. 61/205,278 filed on Jan. 15, 2009, the entire content of which is fully incorporated herein by reference.

BACKGROUND OF THE INVENTION

This invention relates to insulated chimney piping and to methods of connecting the same to form piping for a chimney. More specifically, the invention relates to a positive pressure coupling for a vent pipe, to a vent pipe incorporating the same and to a method of forming vent piping by coupling together such vent pipes. Chimney vent pipes include an inner pipe casing within an outer pipe casing and include an insulating material there-between so as to insulate the outer pipe casing from the heat generated by the gases being vented through the inner pipe casing. In this regard, the outer pipe casing stays cooler than the inner pipe casing, preventing the heat from being transferred to the surrounding structure of the chimney which may lead to hazards, such as fires. Typically, chimney vent piping is formed by coupling together multiple vent pipes. Each vent pipe 10 includes an inner pipe casing 12, an outer pipe casing 14 and an insulating material 16 there-between, as for example shown in FIGS. 1 and 2. The inner pipe casing of each pipe is formed such that it is longer than the outer pipe casing such that a portion 18 of the inner pipe casing extends beyond the outer pipe casing. A flange 20 is formed at the end of the inner pipe casing extending radially outwards. To connect the two pipes together, a sealant is placed on the flange 20 of the inner pipe casing of the first pipe, as well as a flange 20 of an inner pipe casing of a second pipe, as for example shown in FIG. 2. The two pipes are brought together such that the flange 20 of the first pipe sits on the flange 20 of the second pipe, as for example shown in FIG. 3. A gasket material may also be used between the two flanges. The sealant and/or the gasket material typically needs to be capable of withstanding 2,000° F. Not many materials can withstand such temperatures. An annular inner V-band 22, as shown in FIG. 1, is placed over the mated flanges 20. The V-band 22 is an annular band section defining a "V" in cross-section, as for example shown in FIG. 1, such that it can fit over the mated flanges 20. The V-band is formed in sections such that it can be put together to surround the mated flanges of the two inner pipe casings. A sealant is also placed in the inner surface 24 of the V-band, which is placed over the mated flanges 20. Once the sections of the V-band are in place, they are clamped together so as to tightly clamp on to the inner pipe casings. Insulating material 26 is then placed over the V-band between the outer pipe casings of the two pipes being connected. Once the insulating material is fitted properly, an outer channel band 30 is then used to connect the two outer pipe casings 14 by clamping on to the two outer pipe casings 14. The outer band has circumferential flanges 32 formed on its edges which fit in annular groves 34 formed on the outer pipe casings. The coupling of vent pipes according to the prior art is described in U.S. Pat. No. 3,902,744. As can be seen, the connection of prior vent pipes is a cumbersome process that takes time, especially if multiple pipes need to be connected together, and also requires sealants and/or gaskets that can withstand high temperatures, as for example 2,000° F. As such, vent pipes are desired that can be easily coupled to each other and that can be coupled to each other without the use of high temperature adhesives, sealants or gaskets.

SUMMARY OF THE INVENTION

In an exemplary embodiment a vent pipe is provided. The vent pipe includes an inner casing, an outer casing surrounding the inner casing, and an insulation material between the inner and outer casings. The vent pipe also includes, a male end portion, a female and portion for receiving a male end portion end of another vent pipe, the female end portion being opposite the male end portion. The vent pipe further includes a first flange extending from the male end portion, and a second flange extending from the female end portion for mating with a first flange extending from the male portion of another vent pipe. In an exemplary embodiment, both of the first and second flanges extend externally from the inner casing. In a further exemplary embodiment, the vent pipe also includes a male cap connected to the inner and outer casings and defining a male end of the male end portion. In yet a further exemplary embodiment, the vent pipe also includes a female cap connected to the inner and outer casings and defining a female end of the female end portion, such that a male end of another vent pipe is receivable within the female cap. In another exemplary embodiment, the first flange extends from the male cap and the second flange extends from the female cap. In yet another exemplary embodiment, the first flange is integral with the male cap. In another exemplary embodiment, the second flange is integral with the female cap. In one exemplary embodiment, the female cap defines and receptacle and extends within a space between the inner and outer pipe casings. In another exemplary embodiment, the male cap extends over the inner and outer casings. In a further exemplary embodiment, the insulation material is located within the inner and outer casings and within the male and female caps.

In a further exemplary embodiment, a vent pipe system is provided including a first vent pipe and a second vent pipe, wherein each of the first and second vent pipes includes an inner casing, an outer casing surrounding the inner casing, an insulation material between the inner and outer casings, a male end portion, a female and portion opposite the male end portion, a first flange extending from the male end portion, and a second flange extending from the female end portion. The system requires that the male end portion of the second pipe is received within the female end portion of the first pipe and that the second flange of the first vent pipe is mated with the first flange of the second vent pipe. In one exemplary embodiment, each vent pipe of the first and second vent pipes further includes a male cap connected to the inner and outer casings of such vent pipe and defining a male end of the male end portion of the vent pipe. In yet a further exemplary embodiment, each vent pipe of the first and second vent pipes further includes a female cap connected to the inner and outer casings of such vent pipe and defining a female end of the female end portion of the vent pipe, such that the male end of the second vent pipe is received within the female cap of the first vent pipe. In another exemplary embodiment, each first flange of each of the first and second vent pipes extends from the male cap of the first and second vent pipes. In a further exemplary embodiment, each second flange of each of the first and second vent pipes extends from the female cap of the first and second vent pipes. In yet another exemplary embodiment, each first flange of each of the first and second vent pipes is integral with the male cap of such first and second vent pipes. In yet a further exemplary embodiment, each second flange of each of the first and second vent pipes is integral with the female cap of such first and second vent pipes. In a further exemplary embodiment, the female cap of each pipe defines a receptacle and extends within a space between the inner and outer pipe casings of each pipe. In another exemplary embodiment, the male cap of each pipe extends over the inner and outer casings of each pipe. In yet a further exemplary embodiment, the system further includes a band surrounding both vent pipes and the second flange of the first vent pipe and the first flange of the second vent pipe. In yet a further exemplary embodiment, the second flange of the first vent pipe and the first flange of the second vent pipe extend externally from their corresponding outer casing. In one exemplary embodiment, the band clamps the second flange of the first vent pipe and the first flange of the second vent pipe together. In another exemplary embodiment, each of the inner and outer casings of each vent pipe is joggled to define the male end portion of each of the first and second vent pipes. In a further exemplary embodiment, the insulation material is located within the inner and outer casings and within the male and female caps of each vent pipe. In yet a further exemplary embodiment, the male end portion of the second pipe is self aligning with the female end portion of the first pipe.

DETAILED DESCRIPTION OF THE INVENTION

Figure 5:
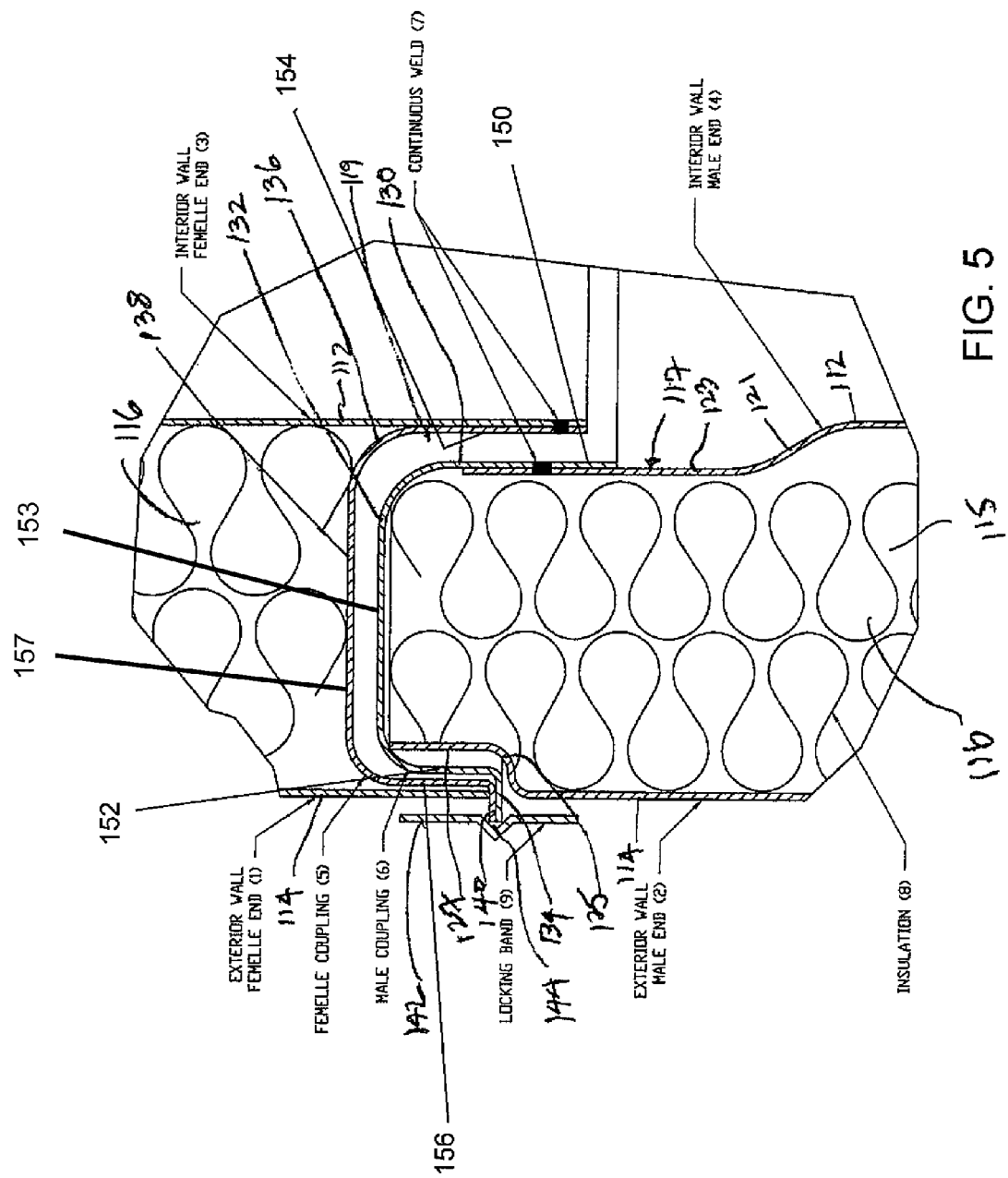
FIG. 5 is a partial cross-sectional view taken along arrow 5-5 in FIG. 4 of two vent pipes of the present invention coupled together.

In an exemplary embodiment, vent pipes are provided which can be easily coupled together using lower temperature adhesives, sealants, caulking and/or gaskets to form vent piping. In this regard, sealants, adhesives or gaskets that are capable of withstanding 2,000° F. are not required. In an exemplary embodiment shown in FIG. 5, each vent pipe includes an inner pipe casing 112 and an outer pipe casing 114. The inner pipe casing 112 is concentric to the outer pipe casing 114 defining an annulus 115 there-between. An insulating material 116, such as glass wool, is fitted in the annulus so as to insulate the outer pipe casing from the inner pipe casing. In an exemplary embodiment, at one end, the vent pipe forms a male portion 117 and at its opposite end forms a female portion 119. In an exemplary embodiment, as shown in FIG. 5, the male portion is formed by forming a joggle 121 on the inner pipe casing in a direction towards the outer pipe casing thereby increasing the diameter of an end portion 123 of the inner pipe casing, as for example shown in FIG. 5. Another joggle 125 is formed on the outer pipe casing at a location closer to the end of the vent pipe than the joggle 121 formed on the inner pipe casing. The joggle 125 extends towards the inner pipe casing such that an end portion 127 of the outer pipe casing has a smaller diameter than the portion of the outer pipe casing prior to the joggle 125. A male cap 130 is connected to the inner pipe casing 112 and extends over the inner pipe casing and over the outer pipe casing 114 defining a male coupling 132. In an exemplary embodiment, the male cap may be adhered, welded or otherwise attached to the inner pipe casing. In another exemplary embodiment, the male cap is adhered, welded or otherwise attached to the inner and/or outer casings. A flange 134 extends radially outward from an end portion of the cap 132. More specifically, the cap 130 is mated to the joggled end portion 117 of the inner casing and the joggled end portion 127 of the outer casing. In the shown example embodiment, the male cap has a first leg 150 adjacent to and axially along the inner casing 112, and a second leg 152 adjacent to and axially along the outer casing 114, and a third leg 153 extending between the male cap first leg 150 and second leg 152.

In an exemplary embodiment, at the opposite end of each vent pipe is formed the female end portion. At that end, the inner pipe casing extends beyond the outer pipe casing. A female cap 136 is placed adjacent to the inner pipe casing 112 and extends across the annulus 115 and adjacent the outer pipe casing 114. In an exemplary embodiment as shown in FIG. 5, the female cap defines a female coupling 138. Furthermore, the exemplary embodiment shown in FIG. 5, the female cap 136 is adhered, welded or otherwise attached to the inner casing 112. In another exemplary embodiment, the female cap 136 is adhered, welded or otherwise attached to the inner and/or outer casings. A flange 140 extends radially outward from the end of the cap 136 proximate the outer casing 114. In an exemplary embodiment, both flange 134 and flange 140 are annular flanges. In the shown example embodiment, the female cap has a first leg 154 adjacent to and axially along the inner casing 112, a second leg 156 adjacent to and axially along the outer casing 114, and a third leg 157 extending between the female cap first leg 154 and second leg 156.

The inner male and female couplings are designed to be self-aligning. In this regard, as one pipe is placed next to the other pipe, the male coupling of one pipe is received within the female coupling of the other pipe thereby self-aligning one pipe with the other pipe. When the male coupling of one pipe is positioned within the female coupling of the other pipe, the flange 134 of the male coupling is mated with a flange 140 of the female coupling such that the flange 140 sits on the flange 134.

Figure 1:
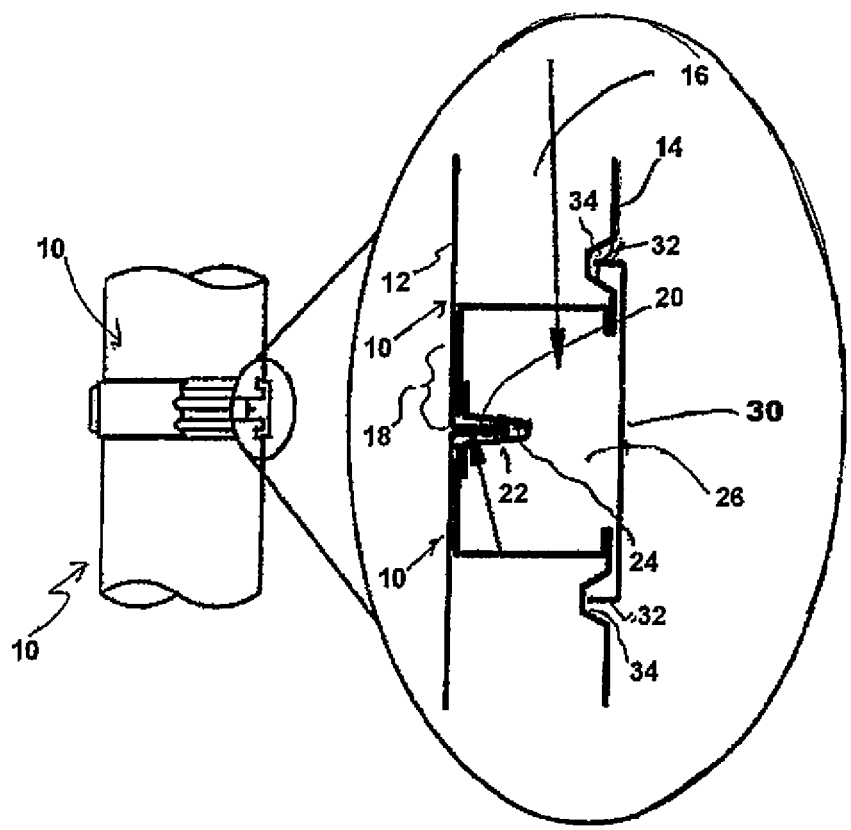
FIG. 1 is a partial cross-sectional view of a blow up section of two prior art vent pipes coupled together.
Figure 2:
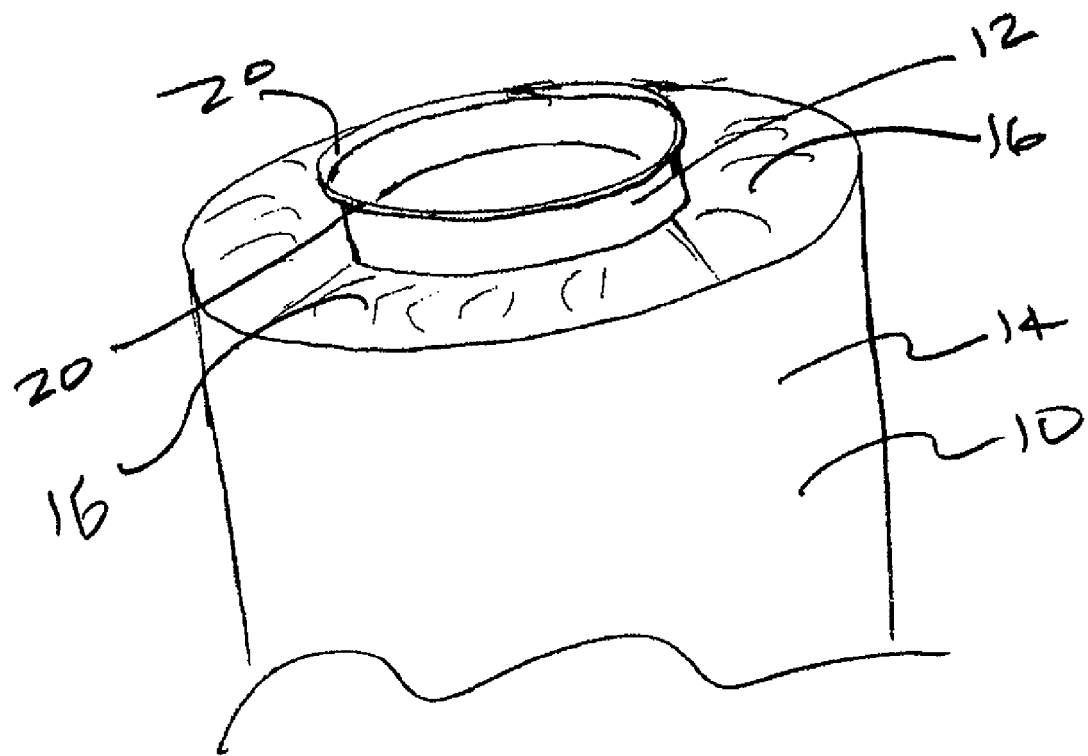
FIG. 2 is a partial perspective view of a prior art vent pipe prior to being coupled to another prior art vent pipe.
Figure 3:
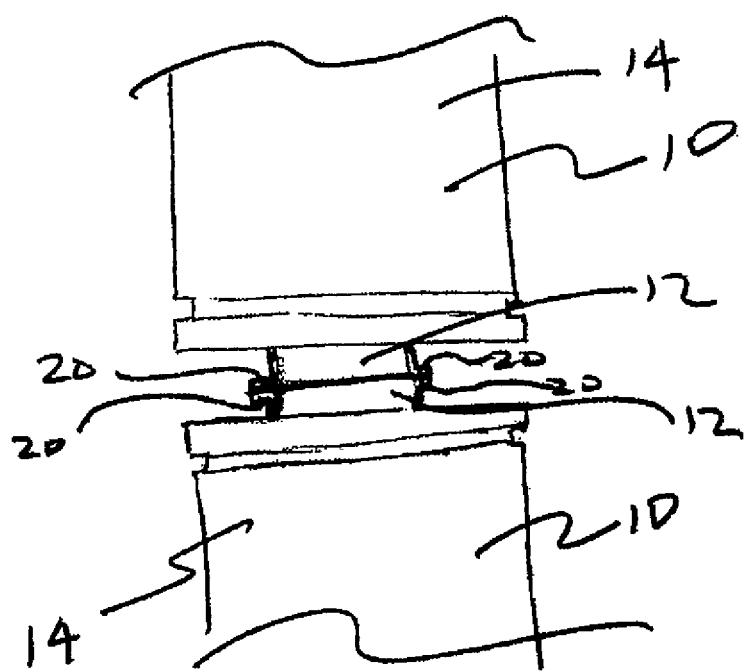
FIG. 3 is a partial end view of two vent pipes with their inner pipe casings coupled together.
Figure 4:
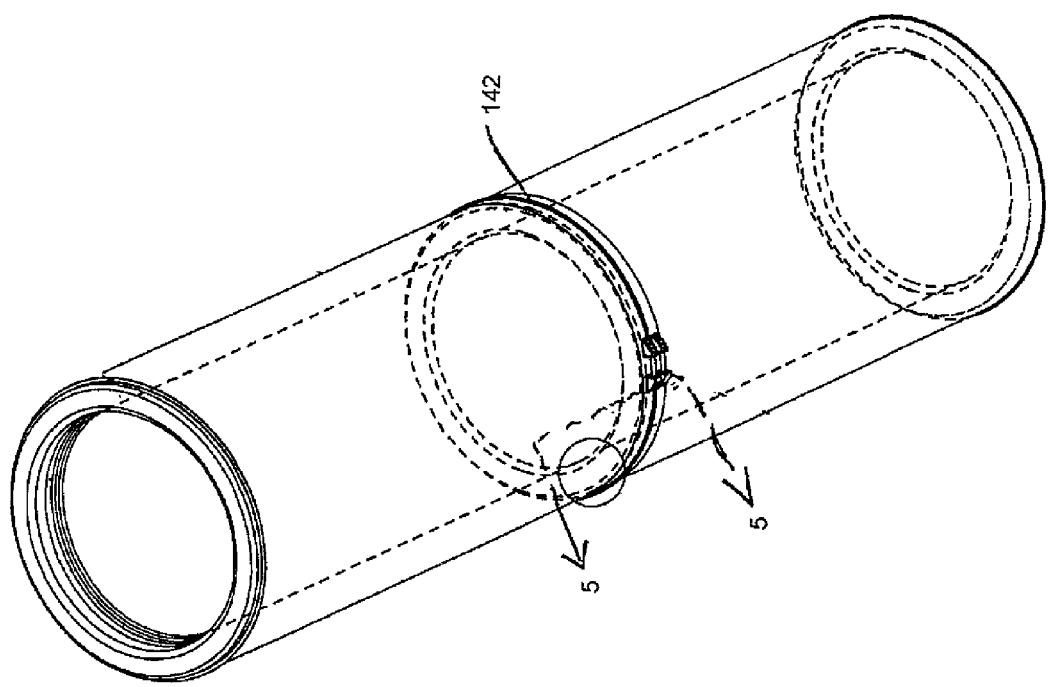
FIG. 4 is a perspective view of two vent pipes of the present invention coupled together.

Prior to attachment, a sealant material, an adhesive, a gasket material, or a caulking material, as for example a lower temperature material such as silicone, is placed on the flange 134. In another exemplary embodiment, the caulking material or sealant material, a gasket may be a placed on either flange 134 and/or flange 140. The two pipes are then brought together such that the female coupling of one pipe receives the male coupling 132 of the other pipe, as for example shown in FIG. 4. An annular of V-band 142 is then positioned such that the mated flanges 134, 140 are received within a groove 144 defined by the "V" of the v-band as for example shown in FIGS. 4 and 5. The V-band may be formed in sections that are placed over the flanges and around the joined outer pipe casings and then connected together so as to clamp over and onto the outer pipe casings of the pipes being coupled, as for example shown in FIG. 4. The sections are then connected together using known methods which would cause the two sections to clamp onto the outer pipe casings. A caulking, an adhesive, a sealant or a gasket material may be placed within the groove 144 of the V-band two coupled pipes according to an exemplary embodiment of the present invention are shown in FIG. 4.

As can be seen with the exemplary embodiment vent pipes, the time to form a vent piping using multiple vent pipes is reduced as the exemplary embodiment vent pipes self-align with each other. Moreover, since the sealing occurs at the outer pipe casings, a high temperature sealant material is not required as it will not be exposed to the high temperatures that the inner casing is exposed to. Furthermore, it is easier to form the coupling between the pipes as one does not have to reach inside the inner casing to form a coupling, as for example by attaching a V-band and one does not have to then go through the process of filling in the gap between the two pipes with the insulating material such as the irritating glass wool which is usually used as the insulating material. Furthermore, with the exemplary embodiment vent pipes, only a V-band is used in aiding in the connection of the pipes of the present invention, whereas the prior art pipes required a V-band and an outer channel band. It should be also understood that other coupling means may be used in lieu of the V-band. For example, a lock band with a different acceptable cross-sectional shape may be used.

What is claimed is:

1. A vent pipe comprising:
    an inner casing extending along an axis;
    an outer casing surrounding the inner casing and extending along an axis;
    a male end portion;
    a female end portion defining a depression extending axially between the inner and outer casings for receiving a male end portion of another vent pipe between said inner and outer casings, said female end portion being opposite said male end portion;
    an insulation material between the inner and outer casings and extending into the male end portion;
    a male cap having a first leg extending axially along the inner casing and a second leg extending axially along the outer casing defining said male end portion, wherein a first flange extends from the male cap second leg extending from the male end portion and externally and radially outward beyond at least a portion of the outer casing and from said male end portion, wherein said male cap comprises a third leg extending between the male cap first and second legs; and
    a female cap having a first leg extending axially along the inner casing and a second leg extending axially along the outer casing defining said female end portion, said female cap having a second flange extending from the female cap second leg and externally and radially outward beyond at least a portion of the outer casing and from said female end portion for mating with a first flange extending from the male end portion of another vent pipe, wherein the female cap includes a third leg extending between the female cap first and second legs, wherein the depression is defined by said female cap first, second and third legs for receiving a male end portion of another vent pipe, wherein when said male end portion of said another pipe is received in said female end portion, a portion of inner and outer casings of said another pipe are sandwiched in a radial direction between a portion of the inner and outer casings of said vent pipe.

2. The vent pipe of claim 1 wherein the male cap extends over the inner and outer casings.

3. A vent pipe system comprising a first vent pipe and a second vent pipe, wherein each of said first and second vent pipes comprises:
    an inner casing extending along an axis;
    an outer casing surrounding the inner casing and extending along an axis;
    a male end portion;
    a female end portion defining a depression extending axially between the inner and outer casings, said female end portion being opposite the male end portion;
    an insulation material between the inner and outer casings and extending into the male end portion;
    a male cap having a first leg extending axially along the inner casing and a second leg extending axially along the outer casing defining said male end portion, wherein a first flange extends from the male cap second leg extending from the male end portion and externally and radially outward beyond at least a portion of the outer casing, wherein said male cap comprises a third leg extending between the male cap first and second legs; and
    a female cap having a first leg extending axially along the inner casing and a second leg extending axially along the outer casing defining said female end portion, said female cap having a second flange extending from the female cap second leg and externally and radially outward beyond at least a portion of the outer casing, wherein the female cap includes a third leg extending between the female cap first and second legs, wherein the depression is defined by said female cap first, second and third legs, wherein the male end portion of the first vent pipe is received in the depression defined by said female cap of the second vent pipe, and wherein a portion of the inner and outer casings of the first vent pipe are sandwiched in a radial direction between a portion of the inner and outer casings of the second vent pipe.

4. The vent pipe system of claim 3 wherein the male cap of each pipe extends over the inner and outer casings of each pipe.

5. The vent pipe system of claim 3 further comprising a band surrounding both vent pipes and the second flange of the first vent pipe and the first flange of the second vent pipe, said band engaging said first and second flanges and being external from said outer casings of said first and second vent pipes.

6. The vent pipe system of claim 5 wherein said band clamps the second flange of the first vent pipe and the first flange of the second vent pipe together.

7. The vent pipe system of claim 3 wherein each of the inner and outer casings of each vent pipe is joggled to define the male end portion of each of said first and second vent pipes.

8. The vent pipe of claim 3 wherein the male end portion of the second pipe is self aligning with the female end portion of the first pipe.

9. The vent pipe of claim 5 wherein the band also surrounds at least a portion of the outer casing of each vent pipe for creating a seal external of the outer casing of said first and second vent pipes.

10. The vent pipe of claim 6 wherein the band also surrounds at least a portion of the outer casing of each vent pipe for creating a seal external of the outer casing of said first and second vent pipes.

11. The vent pipe of claim 1 wherein the first leg of the male cap is adjacent to the inner casing and the second leg of the male cap is adjacent to the outer casing.

12. The vent pipe of claim 11 wherein the first leg of the female cap is adjacent to the inner casing and the second leg of the female cap is adjacent to the outer casing.

13. The vent pipe of claim 1 wherein the first leg of the female cap is adjacent to the inner casing and the second leg of the female cap is adjacent to the outer casing.

14. The vent pipe system of claim 3 wherein the first leg of the male cap is adjacent to the inner casing and the second leg of the male cap is adjacent to the outer casing.

15. The vent pipe system of claim 14 wherein the first leg of the female cap is adjacent to the inner casing and the second leg of the female cap is adjacent to the outer casing.

16. The vent pipe system of claim 3 wherein the first leg of the female cap is adjacent to the inner casing and the second leg of the female cap is adjacent to the outer casing.

\* \* \* \* \*